United States Patent [19]

Shu

[11] Patent Number: 4,591,708

[45] Date of Patent: May 27, 1986

[54] HIGH-INTENSITY OPTO-ELECTRONIC SENSOR HAVING LOW POWER CONSUMPTION

[75] Inventor: Stephen K. Shu, Fountain Valley, Calif.

[73] Assignee: Del Mar Avionics, Irvine, Calif.

[21] Appl. No.: 207,627

[22] Filed: Nov. 17, 1980

[51] Int. Cl.[4] ............................................. G01D 21/04
[52] U.S. Cl. ................................. 250/221; 250/214 R
[58] Field of Search ............... 250/221, 222 R, 214 R; 340/555, 556, 557

[56] References Cited

U.S. PATENT DOCUMENTS 4,063,085  12/1977  Montanvert ........................ 250/221

Primary Examiner—David C. Nelms
Assistant Examiner—Darwin R. Hostetter
Attorney, Agent, or Firm—Beehler, Pavitt, Siegemund, Jagger & Martella

[57] ABSTRACT

An opto-electronic end-of-tape sensor has a pulsed light source for producing high intensity, short duration light pulses and a photodetector controlling a clock driven digital counter. In a normal condition with tape blocking the light pulses, the counter is kept in a reset state. If a clear light path of sufficient time duration is detected the photodetector output enables the counter to reach a predetermined count to obtain an end-of-tape signal output. The sensor circuit discriminates against pinholes in the tape by requiring detection of an uninterrupted predetermined number of light pulses to generate the end-of-tape signal.

8 Claims, 3 Drawing Figures

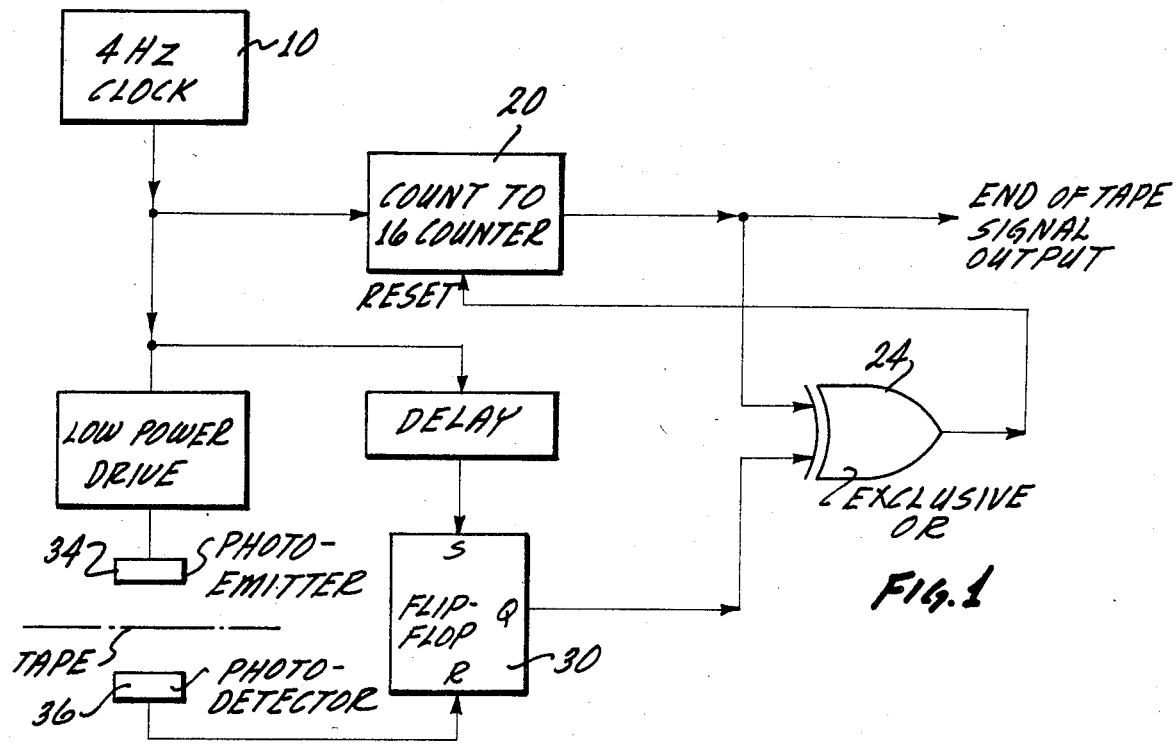
Fig.1
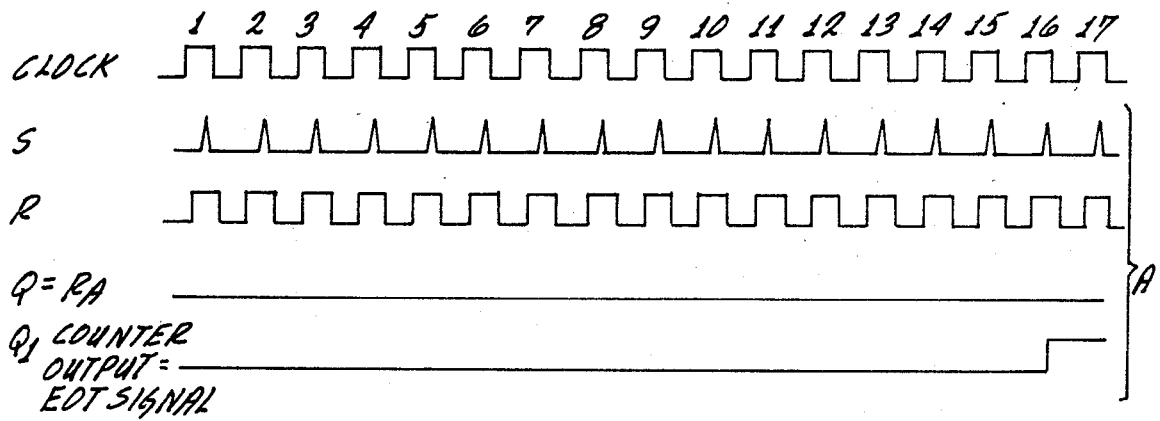
Fig.2
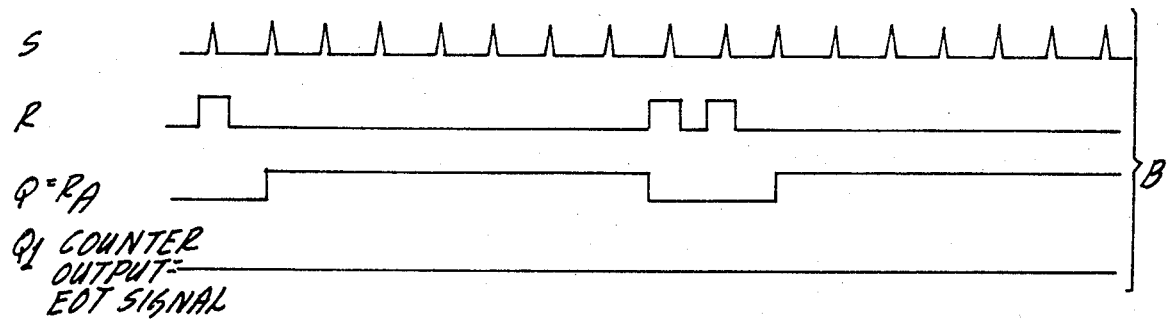

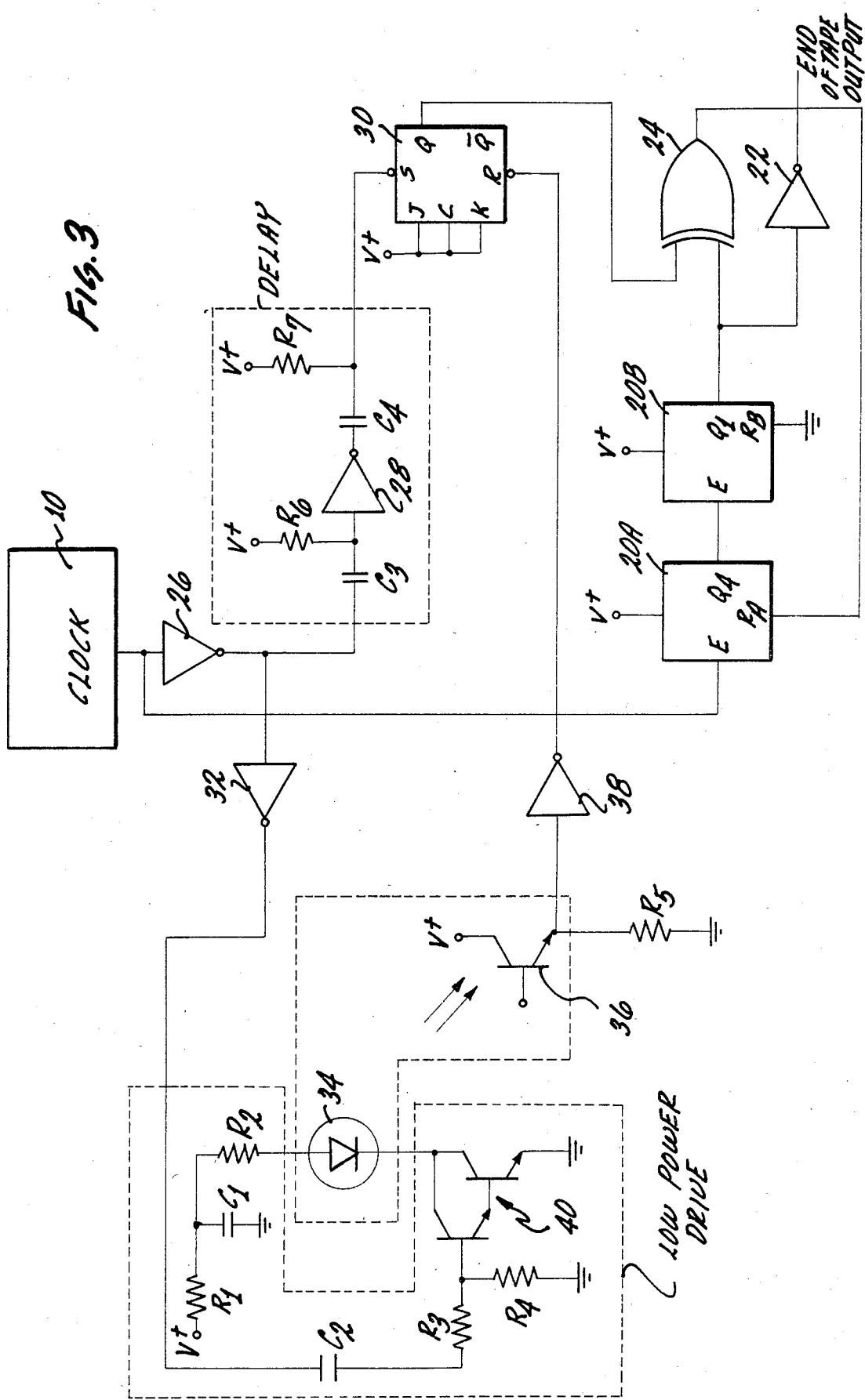

HIGH-INTENSITY OPTO-ELECTRONIC SENSOR HAVING LOW POWER CONSUMPTION

BACKGROUND OF THE INVENTION

1. Field of the Invention

This invention relates to opto-electronic sensors of the type where the presence of an object is detected by projecting a beam of light through the path of the object and detecting the presence or absence of the light beam, and more specifically relates to power-efficient opto-electronic sensors for detecting the end of a reel of tape in a tape-transport mechanism.

2. Background of the Invention

Opto-electronic sensor means based on the principle of interrupting a light beam are known in the art and have been used in the past to sense the presence of a tape on a tape-transport mechanism. The systems used in the past, however, have been found to consume an excessive amount of power when used in battery-powered portable equipment and particularly where due to design limitations inherent in the transport mechanism the source of light must be placed at a relatively large distance from the light detector, such that a more powerful source of light must be used, consequently requiring a greater amount of current to drive the source of light.

SUMMARY OF THE INVENTION

The opto-electronic sensor of this invention overcomes these and other deficiencies of the prior art by providing a low-power drive circuit for achieving a high power output of radiation from a photoemitter device while maintaining very low average power consumption for the end-of-tape sensor circuit. The system of this invention is further capable of discriminating between pinholes in the tape that would otherwise falsely trigger an end-of-tape signal by allowing some of the light to pass through to the photodetector.

More specifically, the end-of-tape sensor of this invention comprises a clock generating a pulse output of relatively low frequency. A driver circuit is triggered by the clock pulses to drive a photoemitter device such as a light-emitting diode with high-current short-duration pulses. The clock pulses also constitute an input to a counter which is pre-set for deriving a sensor output signal upon reaching a predetermined count. The clock pulses are also used for continuously re-setting the counter to prevent it from reaching the predetermined count. A photodetector such as a phototransistor is positioned to detect the radiation pulses emitted by the photoemitter, the tape of the tape-transport mechanism being passed across the path of the light beam. The photodetector derives a pulse output which is responsive to the photoemitter pulses of radiation, and the photodetector output pulses are connected to disable the means for re-setting the counter to thus enable the counter to reach the predetermined count whereupon the sensor output signal is obtained.

The count-to-sixteen counter is continuously re-set by the Q output of a Set-Reset flip-flop which receives at its Set input the clock pulses. The flip-flop remains in a Set condition and the Q output is connected to maintain the counter in a Reset state, such that no counting takes place. The photodetector output is connected to the Reset input of the flip-flop and the timing of the clock pulses at the Set input is made such that the Reset pulses from the photodetector output overlap the Set input pulses, so that the photodetector derived pulses dominate the state of the flip-flop to maintain the same in a Reset condition whenever the photodetector does detect pulses emitted by the photo.

Thus, while photodetector pulses are obtained, the flip-flop changes states and the Q output also changes states, no longer re-setting the counter and enabling the counter to accumulate a count of clock pulses.

Upon reaching a predetermined count of clock pulses, the output of the counter changes logic states, signalling an end-of-tape condition.

The overlap of the Set-Reset pulses at the flip-flop input is ensured by providing a delay circuit for delaying the clock pulses prior to the Set input, as well as making the clock pulses narrower than the photodetector output pulses.

The low-power photoemitter driver circuit includes a capacitor charged by the power supply, and a semi-conductor switch connected for discharging the capacitor through the photoemitter or light-emitting diode to produce a high-current pulse therethrough. The switch is activated or triggered by the clock pulses. Thus, the charge stored in the capacitor between clock pulses is discharged in a brief high-current pulse.

It will be noted, therefore, that the clock output drives the counter, the flip-flop for re-setting the counter, as well as the driver circuit for the photo-emitter.

The counter is pre-set for a given number such as sixteen, whereby the counter output will not change until the predetermined number is accumulated. The sensor circuit is therefore immune to being triggered by pinholes or other flaws or accidents in the tape that may allow a temporary path for the light beam to the photodetector. Additional assurance against false triggering of the circuit is obtained by requiring a continuous count up to the predetermined number, without interruptions of the light beam while the count is accumulated. Thus, a series of pinholes intermittently allowing passage of light through the tape will not trigger the sensor circuit. The sensor is only triggered by a continuous uninterrupted window such as a length of a transparent leader tape passing between the photoemitter and photodetector for a length of time equal to the predetermined count divided by the clock rate.

BRIEF DESCRIPTION OF THE DRAWINGS

FIG. 1 is a block diagram of the end-of-tape sensor of this invention;

FIG. 2 is a logic time diagram showing a sequence A where a clear window is detected of sufficient length to obtain an end-of-tape signal; and a sequence B wherein two pinhole openings are detected at spaced intervals without causing an end-of-tape signal;

FIG. 3 is a schematic diagram of the end-of-tape sensor.

DETAILED DESCRIPTION OF THE INVENTION

Turning now to FIGS. 1 and 3 of the drawings, wherein like numbers designate like circuit elements, a clock 10 generates a pulse output of low frequency such as 4 Hz, the precise frequency being non-critical. The clock pulse output is connected to the input of a counter 20 comprising cascaded stages 20A and 20B. The clock pulses are fed to the Enable input of the counter stage 20A and an output is taken from the $Q_4$ output of stage 20A such that the $Q_4$ output changes states upon the counter's accumulating a count of eight. The $Q_4$ output of stage 20A is connected to the Enable input of counter stage 20B. The counter output is taken from the $Q_1$ output of stage 20B. The $Q_1$ output changes states, e.g., from logical 0 to logical 1, upon reaching a count of sixteen in counter stage 20A.

This result follows from the the fact that both stages 20A and 20B are four-bit binary counters which automatically re-set themselves to zero after counting up to binary sixteen. When stage 20A re-sets to zero after having accumulated a count of sixteen, the output $Q_4$ of stage 20A changes state from logical 1 to logic 0, causing output $Q_1$ of stage 20B to shift from logical 0 to logical 1. This $Q_1$ output is taken through inverter 22 as end-of-tape signals. The $Q_1$ output is also connected to one input of a two-input exclusive OR gate 24, the output of which is connected for re-setting the counter stage 20A.

The clock pulse output is also connected through inverter 26 to a network consisting of $C_3$–$R_6$, inverter 28 and $C_4$–$R_7$, which network operates to delay the clock pulses as well as making them relatively narrow or of shorter duration relative to the clock pulses. These narrow delayed pulses are then fed to the Set input of flip-flop 30. In a normal condition the pulse output of the free-running clock 10 operates to maintain the flip-flop 30 in a Set state with the Q output thereof being in a given logic state. The Q output in this logic state is connected through the exclusive OR gate 24 to the Reset input $R_4$ of counter stage 20A to maintain the counter stage 20A in a Re-set condition, thereby preventing the counter stage from counting the clock pulse input.

A clock pulse output is taken from the output of the inverter 26 and is in turn connected through inverter 32 to a second network comprising capacitor $C_2$ and resistors $R_3$ and $R_4$, the output of this network being in turn connected to the base of a Darlington transistor device. The Darlington device is therefore triggered by each clock output pulse.

A capacitor $C_1$ is connected through a resistor $R_1$ to the power supply and is charged thereby. The capacitor $C_1$ is connected in parallel with a photoemitter device 34, such as a light-emitting diode, with a current-limiting resistor $R_2$ interposed in the circuit to prevent damage to the photoemitter. The cathode of the photoemitter 34 is connected to the collector of the Darlington device, the base of which is connected to system Ground. Thus, the Darlington device operates to switch the charge stored in capacitor $C_1$ through the photoemitter 34 upon being triggered by each clock pulse. The resistance capacitance values are chosen to produce pulses of relatively high current but short intensity to obtain a light output that may be in excess of the continuous ratings of the photoemitter device without damaging the photoemitter.

By way of example only, the values used in a preferred embodiment of the invention are:

| Component | Value |
|---|---|
| $R_1$ | 1 Kiloohm |
| $C_1$ | 10 Microfarads |
| $R_2$ | 30 Ohms |
| $C_2$ | .022 Microfarads |
| $R_3$ | 2.7 Kiloohms |
| $R_4$ | 24 Kiloohms |

A photodetector device such as a phototransistor 36 is positioned to detect radiation pulses emitted by the photoemitter 34 and is mounted on the tape-transport mechanism such that the tape passes through the path traversed by the radiation beam from the photoemitter to the photodetector. The photodetector emitter is connected to Ground through resistor $R_5$ which is preferably a 50-kiloohm resistor, and the collector of the phototransistor is connected to the voltage supply such that a signal output is derived across resistor $R_5$ and constitutes an input to the inverter 38. The phototransistor output is thus connected through the inverter 38 to the Reset or R input of the flip-flop 30. The pulses derived from the phototransistor 36 and the output of inverter 38 are wider or of longer duration than the delayed narrow pulses fed to the S input of the flip-flop 30.

The values of the delay network are selected such that the pulses at the S input fall within the period of the photodetector or R pulses, if any of the latter are produced by detection of the photoemitter pulses. The relative timing of the S and R pulses is best appreciated by reference to the logic timing diagram of FIG. 2. The first line of the timing diagram shows the free-running clock pulse output, each pulse being numbered in sequence. Thereunder, a logic sequence is enclosed in bracket A to show the sequence of events when a clear length of tape or a window such as a length of clear leader passes across the light path of the photosensor. The line marked S shows the delayed narrow pulses derived from the clock pulses and being fed to the Set input of the flip-flop to keep the flip-flop in Set condition and the counter in a normal Reset condition. Because a clear window is being detected, the photodetector derives pulses shown in line R, each photodetector pulse corresponding to one clock pulse, and each R pulse overlapping a corresponding S pulse. The logic state of the Q output of the flip-flop is dominated by the earlier-arriving R pulse derived from the photodetector output, the R pulse also being of longer duration than the narrow S pulse, that is, the entire narrow S pulse falling within a time interval bounded by the leading and trailing edges of a photodetector output pulse or R pulse.

In the preferred embodiment of the invention, the values of the Delay network components are as follows:

| Component | Value |
|---|---|
| $C_3$ | .0022 Microfarads |
| $R_6$ | 100 Kiloohms |
| $C_4$ | 470 Picofarads |
| $R_7$ | 30 Kiloohns |

The overall operation of the sensor circuit can be best appreciated by reference to the time diagrams of FIG. 2. The upper line of the time diagram shows the pulse output of the clock, each pulse being consecutively numbered from 1 to seventeen. The next line thereunder shows the narrow delayed pulses derived from the Delay network and fed to the Set input of the flip-flop 30, each S pulse corresponding to a clock output. The third line shows the input R of the flip-flop while a clear window is being detected by the photodetector Under such circumstances, the photodetector derives an output pulse corresponding to each clock pulse driving the photoemitter. Thus, at the input R of flip-flop 30 a pulse is applied corresponding to every S pulse arriving at the S input of the flip-flop. As can be seen from the diagram, each S pulse coincides with an R pulse, the R pulse completely overlapping the S pulse at the flip-flop inputs. The photodetector-derived R pulses dominate the state of the flip-flop with the result that Q output is kept in a given logic state, this same logic state being applied to the Reset or $R_4$ input of the counter stage 20A. The fourth line from the top in the time diagram, therefore, shows a straight line indicating the steady logic condition of the Q output of flip-flop 30, this Q output being such that the counter stages 20A is enabled for counting the clock input to that stage. As was explained above, the output $Q_1$ of the second counter stage 20B changes logic states only after the first counter stage 20A has accumulated a predetermined count, namely a count of sixteen clock pulses. This change in logic state at the $Q_1$ output is shown in the fifth line from the top of the timing diagram. This change in the $Q_1$ output is passed through the inverter 22 and may be connected to additional circuitry to trigger an end-of-tape alarm or activate additional circuits. Thus the portion of the logic diagram enclosed in bracket A indicates the sequence of events where a length of clear leader tape passes between the photoemitter and photodetector at the end of a reel of tape.

The portion of the time diagram within bracket B of FIG. 2 shows the sequence of events where the photodetector detects pinhole apertures or other openings in the tape prior to the actual end-of-tape or transparent leader portion. To avoid triggering erroneous end-of-tape signals the counter is pre-set to require a predetermined count of clock pulses. Thus, in a preferred embodiment, the required count is sixteen and unless a clear window of sufficient length is detected, smaller openings will be insufficient to trigger an end-of-tape signal. Such a situation is illustrated in part B of the time diagram of FIG. 2.

As shown therein, a pinhole in the tape produces a first detector output pulse or R pulse which overlaps the corresponding S pulse. This re-sets the flip-flop 30 in an initial low-logic state shown in line Q of portion B of the time diagram. However, no further R pulses are detected after the pinhole has passed through the light beam such that when the next narrow S pulse is fed to the S input of flip-flop 30 no corresponding R pulse appears at the R input to keep the flip-flop in Re-set condition. As a result the flip-flop changes state to a Set condition, this change in the flip-flop state being shown as shift to a high-logic state in line Q of portion B of the time diagram. This high-output state of the Q flip-flop output is connected to the Re-set input of counter stage 20A, re-setting the counter and preventing further counting of clock pulses. The flip-flop Q output remains in a high-logic state until such time as additional R pulses are derived from the photodetector output. This takes place eventually where a further opening in the tape causes two additional R pulses to be produced, again causing the flip-flop to momentarily change states, the Q output of the flip-flop going to a low-logic state for the duration of the two R pulses. This re-set condition of the flip-flop 30, however, lasts only until the next S pulse is fed to the Set input without a corresponding R pulse, at which point the flip-flop is again brought to a Set condition, the change in Q output state causing the counter stage 20A to be re-set again to a zero count and also preventing further counting of clock pulses. It will thus be apparent that any number of detector output pulses R will not trigger an end-of-tape signal unless they are in an uninterrupted series, each overlapping a corresponding S pulse.

While the particular counter arrangement shown in FIG. 3 has been chosen because of conveniently available commercial packages, it will be understood that various changes in the particular counter used are possible without departing from the scope of the invention. Similarly, changes are possible in the values of the various components and specific logic elements shown and described herein. For purposes of illustration only, the semi-conductors used in a preferred embodiment of the invention are listed below:

Counter Stage 20A—½ of dual counter package 4520
Counter Stage 20B—½ package of dual counter 4520
Darlington Driver 40—MPSA14
Photoemitter 34—MLEB60
Photodetector 36—L14G1

It will be understood that changes and substitutions in the components are possible without departing from the invention as defined in the claims.

The operation of the 4520 binary counter is explained in the 1977 SMOS Databook published by National Semi-Conductor of Santa Clara, Calif., at pages 2-218 through 2-222. The operation of a flip-flop with Set and Reset inputs is taught at pages 2-75 through 2-78 of the same publication.

It will be noted that when an end-of-tape signal output is obtained at output $Q_1$ of the second counter stage 20B this signal is fed back through one input of the two-input exclusive OR gate 24 to the Reset input $R_4$ of the first counter stage 20A, thereby re-setting and preventing further counting by this counter stage. This operates to latch the sensor output signal derived from output $Q_1$ of the second counter stage 20B. This output $Q_1$ remains in latched condition until an interruption occurs in the photodetector output pulses or R pulses fed into the flip-flop 30. When such an interruption occurs the output Q of the flip-flop returns to Set condition, this new state of the Q output being the second input to the two-input exclusive OR gate. The resulting output of the exclusive OR gate changes logic states such that the first counter stage 28 no longer in Reset condition and begins to count again the input clock pulses. When a sufficient count is accummulated in the first counter stage 20A the output $Q_4$ thereof will change logic states, thus causing the output $Q_1$ of the second counter stage 20B to also return to a normal condition, thus re-setting the sensor circuit until another clear window of sufficient length is detected by the photodector 36.

It will be understood that the opto-electronic sensor of this invention is not limited to application in tape-transport mechanism but will be found useful in many other applications where a low-power sensor is desired.

What is claimed is:

1. A photoelectric sensor of low power consumption comprising:
   a clock generating a pulse output;
   photoemitter means;
   means responsive to said clock signal for pulsing said photoemitter means;
   counter means for counting said clock output and deriving a sensor output signal upon reaching a predetermined count;
   means for normally re-setting said counter means prior to reaching said predetermined count; and
   photodetector means for deriving a pulse output responsive to said photoemitter pulses, said photodetector output being connected for disabling said means for re-seting to enable said counter means to reach said predetermined count to thereby derive said sensor output signal.

2. The photoelectric sensor of claim 1 wherein said means for normally re-setting comprise Set-Reset flip-flop means having:
   an output operatively connected to the reset input of said counter means;
   a first input receiving said clock pulses for normally maintaining said flip-flop means in a first state such that said counter is prevented from counting by said Reset input; and,
   a second input receiving said photodetector pulse output for changing the state of said flip-flop output to enable said counter to count.

3. The photoelectric sensor of claim 2, said photodetector pulses being wider than said clock pulses and overlapping the same at said flip-flop inputs such that said flip-flop output is non-responsive to said clock pulses in the presence of said photodetector pulses, said counter means remaining enabled so long as a pulse output is derived by said photodetector means.

4. The photoelectric sensor of claim 2 or claim 3 further comprising delay means for delaying said clock pulses such that said photodetector output pulses fully overlap said narrower clock pulses at said flip-flop inputs whereby said photodetector output dominates the state of said flip-flop output.

5. The photodetector of claim 1 or claim 2 wherein said meand for pulsing said photoemitter means comprises means for driving said photoemitter means with short-duration high-current pulses, the duration of said high-current pulses being substantially less than the duration of said clock pulses.

6. The photodetector of claim 1 or claim 2 or claim 3 wherein said means for pulsing said photoemitter comprise:
   a capacitor for storing an electrical charge;
   semi-conductor switch means connected for discharging said stored charge through said photoemitter to thereby cause the emission of a pulse of radiation, said switch means being triggered by said clock pulse output for discharging said stored charge.

7. The photodetector of claim 1 wherein said counter means comprises:
   a first binary counter stage having an input receiving said clock pulses, a Reset input, and a binary output;
   a second binary counter stage having an input operatively connected to said first stage binary output, said second stage also having a binary output;
   said binary output of said first stage changing logic states upon the counter accumulating a predetermined count thereby causing said binary output of said second counter stage to change logic states, said changed logic state of said second stage constituting a sensor output signal; and
   means feeding back said binary output of said second counter stage to said Reset input of said first counter stage to thereby latch said sensor output signal.

8. The photodetector of claim 7 wherein said feedback means comprise two-input exclusive-OR gate means receiving said second counter stage output as one input, the other input being operatively connected to said flip-flop output, the output of said exclusive-OR gate means being operatively connected to said reset counter input, whereby said first counter stage is reset by said sensor output signal thereby latching said output of said second counter stage, said output of said exclusive-OR gate means switching logic states to unlatch said sensor output signal by allowing said first counter stage to resume counting of said clock pulses upon renewed interruption of said photodetector pulse output.

* * * * *